United States Patent [19]

Magnaghi

[11] 4,339,871
[45] Jul. 20, 1982

[54] METHOD OF CENTER LOCKING FOR THE BEARING OF A ROTOR SHAFT UNIT ON THE STATOR OF AN ELECTRIC MOTOR

[75] Inventor: Adriano Magnaghi, Mozzate Coma, Italy

[73] Assignee: Olmo Emerson S.p.A., Caronno Pertusella, Italy

[21] Appl. No.: 74,956

[22] Filed: Sep. 13, 1979

[30] Foreign Application Priority Data

Sep. 19, 1978 [IT] Italy ............................. 27834 A/78

[51] Int. Cl.³ ............................................. H02K 15/14
[52] U.S. Cl. ................................... 29/596; 29/522 R; 310/42; 310/89; 310/90
[58] Field of Search ............. 29/596, 598, 609, 522 R, 29/522 A; 310/42, 258, 259, 89, 90, 217

[56] References Cited

U.S. PATENT DOCUMENTS

| | | | |
|---|---|---|---|
| 2,606,083 | 8/1952 | Kitto et al. | 310/90 X |
| 2,871,384 | 1/1959 | Gabriel | 310/258 |
| 2,884,038 | 4/1959 | Overton | 29/522 |
| 3,126,568 | 3/1964 | Wubbe | 29/522 |
| 3,265,781 | 8/1966 | Peterson | 29/522 |
| 3,348,300 | 10/1967 | Lindgren | 29/596 |
| 3,428,842 | 2/1969 | Harris | 29/596 X |

Primary Examiner—Carl E. Hall
Attorney, Agent, or Firm—Polster, Polster and Lucchesi

[57] ABSTRACT

A method for center locking a cap on a stator of an electric motor includes the steps of conventionally registering the rotor relative to the stator and arranging said cap in centered relationship relative to said stator. Passage holes through the cap for rods extending through the motor are provided with inner tongues intended to be deformed by the clamping of bolts attached to the rods provided with a shaped portion which cooperates with the rods so as to ensure the centering of said cap relative to the stator.

3 Claims, 7 Drawing Figures

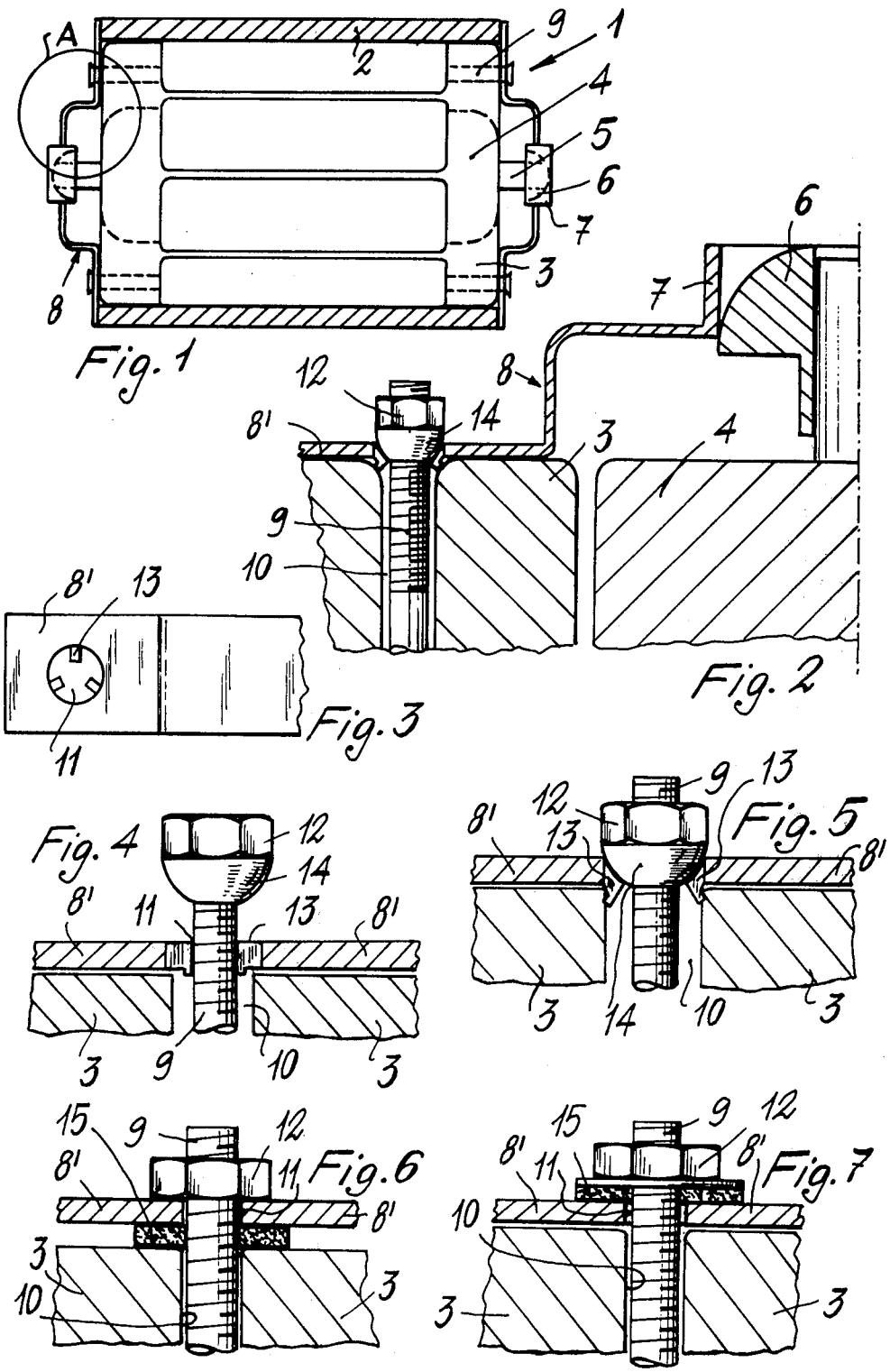

METHOD OF CENTER LOCKING FOR THE BEARING OF A ROTOR SHAFT UNIT ON THE STATOR OF AN ELECTRIC MOTOR

This invention relates to a method for the center locking of the bearing for a rotor shaft unit of a stator of an electric motor. For simplicity, such a bearing will be hereinafter referred to as a "cap".

As well known, such caps require correct centering relative to the stator to ensure as constant an air gas as possible.

At present, the conventional art provides for center locking of these caps by two main methods. In a first method, the cap is provided with calibrated drawn holes for penetration into channels or passages in the stator which are intended to accommodate clamping rods. In a second method, the rotor is registered relative to the stator by temporarily interposing removable shims between the stator and rotor, arranging the cap centered relative to the rotor and frictionally locking said cap by high strength rods on said stator.

The first method has the disadvantage of requiring abosulute accuracy in forming the drawn holes, which operation involves particular equipment and substantial amounts of time. The operation, consequently, is inconsistent with motor production on a large scale. The second method has the serious disadvantage that, due to vibration or the like, the bolts of the clamping rods show a tendency to become loosened, so as to be incapable of assuring the required frictional locking of the cap on the stator with a resulting misalignment of the bearing relative to the rotor shaft. With the second method, no lead-in or similar projections are provided for cooperating with the rod passages, so that even the least loosening of the bolts is a high risk for the correct operation of the motor.

It is the object of the present invention to provide a method for center locking a cap on the stator of an electric motor, thereby avoiding the disadvantages found in conventional methods and ensuring a rapid, correct and durable centering and locking of the rotor bearing on the stator.

This and other objects of the invention will become apparent to those skilled in the art from reading the following description and claims.

According to the invention, locking occurs by means of rods passing through channels or passages along the stator, and the cap is provided with holes for the passage of the rods. The method includes the steps of registering the rotor relative to the stator and arranging said cap as centered with respect to said stator, and is essentially characterized by further including the steps of causing a forced deformation in said passage holes through the cap, or parts associated with said holes, by clamping of said rods, and causing the deformed portion of said holes or parts associated therewith to engage said channels or passages, so as to assure a constant centering of the cap relative to the stator, the locking being assured by the clamping of the rods.

Certain preferred embodiments of the method according to the invention are shown merely by way of unrestrictive example in the accompanying drawings, in which:

FIG. 1 is a side view showing an electric motor with caps locked at centered relationship by the method according to the invention, wherein for the sake of clarity the motor casing is shown in a cutaway view;

FIG. 2 is an enlarged view showing the portion A of FIG. 1;

FIG. 3 is a plan view showing the end portion of the cap with the passage hole for a rod;

FIG. 4 shows a portion of FIG. 3 during the center locking operation of the cap on the stator;

FIG. 5 is a view similar to FIG. 4, but showing the operation upon locking completion;

FIG. 6 shows a possible modified embodiment upon completion of the center locking operation; and FIG. 7 shows another possible modified embodiment upon completion of the center locking operation.

Referring particularly to FIGS. 1 to 5, an electric motor generally designated at 1 conventionally comprises a casing 2 a stator 3 and a rotor 4 therein. A shaft 5 of rotor 4 is carried at each end by a bearing 6 located within a seat 7 forming part of a cap, generally designated at 8. The cap 8 is secured to stator 3 by rods 9 passing along channels or passages 10 provided along said stator, and more particularly, is secured to stator 3 along a plurality of holes 11 provided in the end of a corresponding number of end fins 8' of cap 8, and clamped by suitable nuts or bolts 12.

For carrying into effect the method according to the invention, the holes 11 are provided with inner tongues 13 originally on the same plane as the corresponding fin 8', the nuts or bolts 12 have an underlying shape 14 (see particularly FIGS. 2, 4 and 5) which is suitable to act on the tongues 13, during the tightening or drawing up of the nut or bolt 12. The pressure exerted by the shape 14 deforms and folds the tongues 13 (FIGS. 2 and 5), so as to cause the tongues 13 to penetrate into the channels or passages 10, automatically and correctly. In order to facilitate the correct centering of rotor 4 relative to stator 3, removable shims may be employed, if desired.

In a first possible modified embodiment, as shown in FIG. 6, a washer 15 of relatively soft material, such as lead, is interposed between the stator 3 and fin 8'. Thereafter, the clamping of nut and bolt 12 causes the washer to buckle and deform, causing the washer to penetrate both into the channels 10 and the hole 11. The deformation will occur whether or not the holes 11 also are equipped with tongues 13.

In a further possible modified embodiment, as shown in FIG. 7, a washer 15 of relatively soft material is positioned between said nut or bolt 12 and fin 8', so as to penetrate the hole 11 by deformation during tightening of the bolt and nut 12.

Of course, other possible embodiments could be devised, but which will also be within the inventive concept herein described and claimed, and essentially consisting of providing drawings or similar deformations of parts directly at locking, so as to assure a correct centering without requiring any complex precautionary operations.

What is claimed is:

1. A method for center locking a cap of a stator of an electric motor, said motor including a rotor, said cap being attached to said stator by rods passing through channels in said stator, said cap having openings in it for loose passage of said rods, and means associated with said cap along said openings for mounting said cap to said stator, said mounting means initially being in a plane parallel to an end face of said stator, comprising the steps:

registering said rotor relative to said stator;
placing at least one cap at centered relationship with respect to said stator; and tightening at least one nut on said rods so as to cause a force deforming the mounting means associated with said openings in said cap from said parallel plane so as to engage said channels and ensuring a constant center for the cap relative to the stator, thereby positioning said rotor with respect to said stator to maintain a proper air gap therebetween.

2. The method of claim 4 wherein the mounting means associated with said openings comprise a plurality of tongues extending radially inwardly of said openings, said tongues having a first position disassociated from the channels in said stator to permit the cap to be located properly without interference of said tongues, further including the step of shaping said nut with a shape for engaging said tongues, the deforming force of said nut acting on said tongues to deform said tongues and cause them to penetrate into the channels of said stator after proper location of said cap so as to ensure a constant centered relationship for the cap relative to the stator.

3. The method of claim 4 wherein said mounting means associated with said openings includes a deformable metal element interposed between said nut and said cap and being flush fitting with each in an initial condition, said deformable metal element being deformed by the tightening of said nut so as to penetrate into the openings of said cap and the channels in said stator so as to ensure a constant centered relationship for the cap relative to the stator.

* * * * *

UNITED STATES PATENT AND TRADEMARK OFFICE
CERTIFICATE OF CORRECTION

PATENT NO. : 4,339,871
DATED : July 20, 1982
INVENTOR(S) : Adriano Magnaghi

It is certified that error appears in the above—identified patent and that said Letters Patent is hereby corrected as shown below:

Abstract, line 8 "attached to the rods provided with" should read "attached to the rods. The bolts are provided with".

Column 1, line 11, "gas" should be "gap".

Column 1, line 24, "abosulute" should be "absolute".

Column 2, line 15, "casing 2 a stator 3" should read "casing 2 for accommodating a stator 3".

Claim 2, line 1, "4" should be "1".

Claim 3, line 1, "4" should be "1".

Signed and Sealed this

Nineteenth Day of October 1982

[SEAL]

Attest:

Attesting Officer

GERALD J. MOSSINGHOFF

Commissioner of Patents and Trademarks